Nov. 17, 1942.  J. M. DANNHEISER  2,302,192
EMERGENCY POWER SYSTEM
Filed March 29, 1940
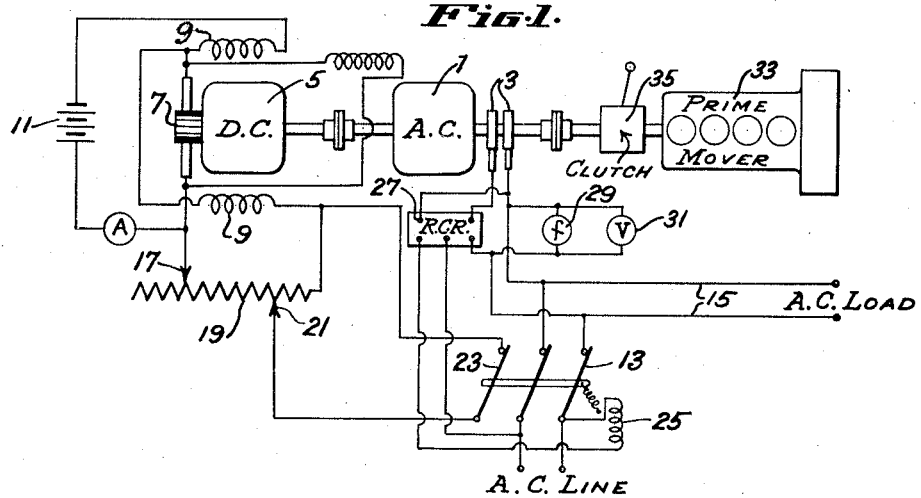
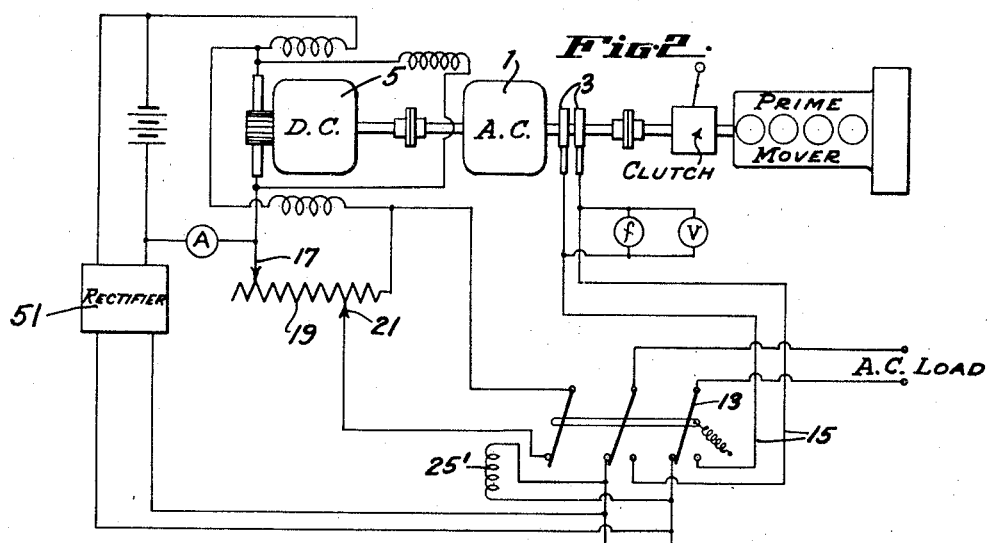
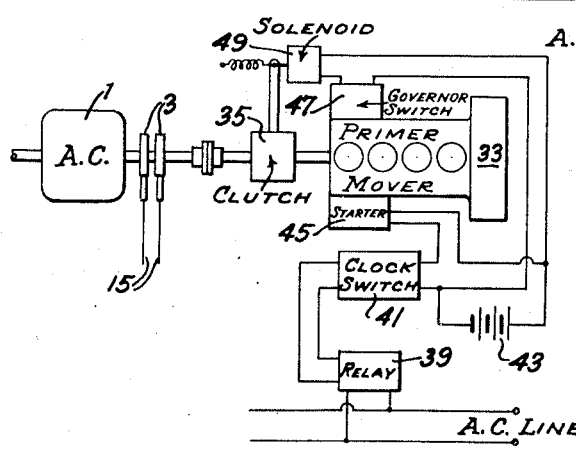
INVENTOR.
JOSEPH M. DANNHEISER
BY Lippincott + Metcalf
ATTORNEYS.

Patented Nov. 17, 1942

2,302,192

UNITED STATES PATENT OFFICE 2,302,192

EMERGENCY POWER SYSTEM

Joseph M. Dannheiser, San Francisco, Calif., assignor to Es-B-Es-Co., "Ltd.," San Francisco, Calif., a corporation of California Application March 29, 1940, Serial No. 326,726

2 Claims. (Cl. 171—314)

This invention relates to emergency power supply equipment, and particularly to such equipment for use in circumstances where such characteristics as frequency and voltage must be kept substantially constant, and where, as, for example, in radio stations, an outage of a few seconds may have effects which would keep the apparatus supplied out of operation for a material time after the supply is reestablished.

Among the objects of my invention are: To provide an emergency power supply which, upon failure of the main supply, will assume the load so rapidly and with such small variation in frequency and voltage that no interruption is detectable from the performance of the load equipment itself, even though such equipment may be extremely sensitive to frequency and voltage changes; to provide a storage battery excited emergency power system which will supply an alternating current load without material frequency shifts; to provide equipment of the type set forth which is operative to keep the storage battery driving the same constantly in charged condition, and, when the load is transferred to said storage battery, to compensate for the voltage drop caused by the withdrawal of power therefrom; to provide an emergency power system which will assume the load as aforesaid upon short outages, and will transfer the load again to a prime mover automatically upon the occurrence of outages of longer duration than the battery is equipped to care for, without the necessity of manually controlled synchronizing operations; and, in general, to provide an emergency power supply which will meet the rigorous requirements of such supplies when used in connection with radio broadcasting stations.

Other objects of my invention will be apparent or will be specifically pointed out in the description forming a part of this specification, but I do not limit myself to the embodiment of the invention herein described, as various forms may be adopted within the scope of the claims.

Referring to the drawing:

Figure 1 shows schematically an embodiment of my system wherein the normal or idling power, used to keep the storage battery in fully charged condition and to maintain the equipment in readiness to assume the load, is supplied directly from the alternating current mains.

Figure 2 is a similar diagram, showing a modification wherein the charging and idling power is supplied through a rectifier, the drive at all times being from the direct current side of the device.

Figure 3 is a fragmentary diagram, indicating the connections which may be used with either the modifications of Figure 1 or Figure 2, in order to transfer the load automatically to a prime mover.

Considered broadly my invention comprises dynamo-electric apparatus having an A.-C. end and a D.-C. end, i. e., a motor generator, dynamotor, or rotary converter. It is to be understood that "end" as used in this specification is colloquial, and does not necessarily refer to opposite ends of the shaft of the machine, since the term is equally applicable to motor generators wherein both slip rings and commutator are mounted at the same end of the shaft. The A.-C. end of the apparatus is preferably of synchronous type and an emergency storage battery is, in operation, constantly connected across the D.-C. end of the machine. The device is provided with connections for the A.-C. load and the regular supply mains, and switching equipment is provided for interrupting this supply when the power from the mains fails. Connections are also provided from the mains to supply power to one end of the dynamo-electric apparatus to keep it in rotation at substantially synchronous speed, and additional means, operating coordinately with the main interrupting or transfer switch, changes the constants of the D.-C. circuit so that the D.-C. end of the device, acting as a motor supplied from the battery, will hold the speed constant (and hence the frequency and voltage) when the load is carried by the A.-C. end acting as a generator. There is also preferably provided a prime mover, such as a gasoline or Diesel engine, provided with clutch mechanism, and which may be therefore brought up to speed and connected to drive the equipment in case of outages which continue for a period beyond the capacity of the storage battery. For minor installations the clutch may be hand-operated, and the bringing of the prime mover into service may be manually accomplished by the operator. It is preferred, however, to provide a relay operated by the outage of the A.-C. line, which functions to start in motion a time-delay or clock switch actuating the starting motor on the prime mover after a predetermined period following the outage. The prime mover is provided with a governor, which brings it gradually up to speed and when the desired speed of operation has been obtained, closes a circuit to throw the clutch connecting the prime mover with the emergency generating equipment, whereafter the prime mover carries the load and the battery may either float on the line without recharge or may be brought up to charge by the D.-C. end of the machine acting as a generator.

In the simplest and hence preferred form of the device shown in Figure 1, the dynamo-electric apparatus used is shown as a motor generator having its A.-C. end 1 provided with slip rings 3 and its D.-C. end 5 provided with a commutator 7. The D.-C. end of the machine may be either shunt wound or it may have compound windings. As it is required to act on occasion both as a generator and as a motor, an interpole type of machine is desirable. The shunt field of the D.-C. end is indicated by the coils 9, and it is to be understood that the A.-C. end may be provided with its own exciter or its field may be supplied from the D.-C. winding and the storage battery 11 which is connected across the commutator.

This storage battery constitutes the emergency power supply. It must be capable of delivering sufficient power to supply the emergency load. Its capacity, however, in terms of kilowatt hours, may vary widely, depending on whether it is the sole reliance in case of emergency demands, or whether a prime mover is available for standby service.

Under normal or non-emergency conditions the load is supplied from an A.-C. line (so marked) through a transfer switch or circuit-breaker 13, the leads 15, and the brushes 3 being permanently connected in parallel with the load, so that the A.-C. end of the motor-generator acts as a synchronous motor to maintain it in operation at predetermined speed. Under these conditions the D.-C. end operates as a generator to keep the battery 11 fully charged, the contact 17 on the shunt field rheostat 19, and contact 21 on the same rheostat being so adjusted as to give the proper potential for this purpose.

The transfer switch 13 is supplied with an additional contact 23, which is normally closed to short out a portion of the field rheostat 19. The contactor is held closed normally by the usual hold-in coil 25, this coil being connected across the line through the contacts of a reverse current relay 27 which is connected to respond to the direction of power flow through the brushes 3. As long, therefore, as the power supply from the A.-C. line is maintained the transfer switch will be held closed by the coil 25, but should this supply fail to the point where the synchronous machine 1 starts to feed back power into the line the transfer switch will open, and the A.-C. load will be immediately assumed by the synchronous machine 1 acting as a generator. The opening of the main contacts of the switch is necessary, because under ordinary circumstances the generator 1 would attempt to supply all of the load connected to the mains, which would, of course, far overtax its capacity. With only the load on the lines 15 connected to it, however, being the load it is designed to supply, there will be no overload present, but the speed would tend to drop owing to the drop in voltage of the battery 11 under load. This tendency is overcome by the opening of the contact 23, which cuts in the remaining portion of the field resistor 21, thus weakening the shunt field sufficiently to keep the speed constant.

The contacts 17 and 21 are, of course, set when the machine is initially installed so as to charge the battery under proper constant-potential conditions, and so that the change in field strength which occurs on the opening of the transfer switch will give the proper speed when the functions of motor and generator are interchanged between the A.-C. and D.-C. ends of the device. If the outage continues for a sufficient length of time so that the battery voltage tends to drop materially, the contact 17 may be adjusted manually, by reference to the frequency meter 29 and volt meter 31, provided for the purpose, or, if desired, the adjustment may be made automatically by means well known in the art.

The portion of the apparatus thus far described is completely self-contained and will operate to supply the load for a period which is dependent entirely upon the capacity of the storage battery 11. In many cases, however, it may be necessary to provide for longer outages than it would be economical or practical to supply from such a source. This is the case in connection with radio transmitters which must be kept in constant operation even though the ordinary source of power is interrupted by conditions of flood or fire which may take many hours or days to correct, and for such emergencies a prime mover such as the Diesel or gas engine 33 may be provided. If the outage exceeds the ordinary service interruption, the operating personnel may set the prime mover in motion, bring it up to speed, and connect it to the generator by means of the clutch 35 when proper speed has been obtained. After this has been done the load may be shifted to the prime mover without varying voltage or frequency by adjustment of the contact 17, so that the battery 11 either floats or, preferably, recharges, the choice here depending upon the power available from the prime mover.

Where it is desired, however, to remove the human element in the operation even more completely, the additional equipment shown in Figure 3 may be utilized. In order to conserve space this shows only the A.-C. end 1 of the motor-generator set and the brushes 3 connecting to the leads 15, the remainder of the equipment being as shown either in Figure 1 or Figure 2. Where this additional equipment is used a relay 39 is connected across the line, and operates upon power failure to set in motion a time-delay or clock switch 41. After a predetermined time, which may be anything from a few minutes to a few hours, depending upon the nature of the installation, the clock switch closes to complete a circuit from a starting battery 43 through a conventional starter 45 which sets the prime mover 33 in operation. When the prime mover comes up to speed, a switch 47 operated by the motor governor comes into operation, and closes the circuit from the battery 43 through a solenoid 49 to operate the clutch 35 automatically, whereafter the operation is the same as in the case of manual operation.

The modification of the system shown in Figure 2 differs from that shown in Figure 1 primarily in that the D.-C. end 5 of the motor generator set acts as the driving end at all times, the A.-C. end 1 being normally disconnected entirely from the load. This arrangement possesses the minor advantage that it is not necessary to synchronize the motor generator set before throwing it across the line. In this case the battery is kept charged and the no-load losses of the motor-generator set are supplied from the A.-C. line through a rectifier or charger 51. In this case the hold-in coil 25' of the transfer switch 13 may be merely the ordinary low-voltage release, since the generator 1 will not supply current to keep it excited if the voltage fails. On operation of the switch 13 the supply to the load is interrupted momentarily while the switch is actually operating, but is immediately assumed by the generator 1 when the switch contacts to close the circuit to the leads, 15. While this arrangement may be better when completely unskilled personnel must be relied upon in emergencies, in general the modification shown in Figure 1 is to be preferred.

It is to be understood that the invention has been described in connection with a motor-generator largely in the interests of simplicity. A rotary converter may be substituted with some saving in weight, and, perhaps, in cost, proper precautions being taken to prevent undue speed variations when driven from the D.-C. end and acting as an inverter. The equivalency of such machines being well known in the art as well as the necessary precautions to provide speed constancy under these conditions, detailed discussion here is thought unnecessary.

I claim:

1. In a system for supplying emergency power to an A. C. load upon failure of an A. C. power line normally supplying power for said load, comprising a synchronous A. C. motor driven from said line, a single D. C. generator having a controlling field and mechanically coupled to said A. C. motor, storage batteries normally and directly charged by said D. C. generator, with a predetermined value of said controlling field and automatic switching means for completely disconnecting said A. C. load from said main A. C. line and connecting it to the input of said A. C. motor when the main A. C. line voltage drops below a predetermined value, whereby said D. C. generator rotates in the same direction as a D. C. motor directly energized from said batteries to drive said A. C. motor as an A. C. generator, said automatic switch means being connected to simultaneously change said controlling field to a new value regulating the speed of said A. C. motor while acting as a generator to a speed delivering A. C. current to the A. C. load at the same A. C. frequency as the A. C. mains.

2. In a system for supplying emergency power to an A. C. load upon failure of an A. C. power line normally supplying power for said load, comprising a synchronous A. C. motor driven from said line, a single D. C. generator having a controlling field and mechanically coupled to said A. C. motor, storage batteries normally and directly charged by said D. C. generator, with a predetermined value of said controlling field, a reverse current relay connected between said A. C. motor and said A. C. load and said A. C. power line, and automatic switching means for completely disconnecting said A. C. load from said A. C. power line and connecting it to the input of said A. C. motor generator when the A. C. power line voltage drops below a predetermined value, whereby said D. C. generator rotates in the same direction as a D. C. motor directly energized from said batteries to drive said A. C. motor as an A. C. generator, said automatic switch means being connected to simultaneously change said controlling field to a new value regulating the speed of said A. C. motor while acting as a generator to a speed delivering A. C. current to the A. C. load at the same A. C. frequency as the normal A. C. power line frequency.

JOSEPH M. DANNHEISER.